United States Patent
Wu et al.

(10) Patent No.: US 6,218,080 B1
(45) Date of Patent: Apr. 17, 2001

(54) PLATED FLAT METAL GAP FOR VERY NARROW RECORDING HEADS

(75) Inventors: Xuehua Wu, Union City; Kochan Ju, Fremont; Jei-Wei Chang, Cupertino, all of CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/519,610

(22) Filed: Mar. 6, 2000

(51) Int. Cl.[7] .............................. G11B 5/23; C25D 1/10; C25D 5/02
(52) U.S. Cl. .................. 430/314; 430/319; 29/603.07; 205/122; 205/210; 205/215; 205/70
(58) Field of Search ........................... 430/314, 319; 205/70, 78, 122, 135, 170, 210, 215; 360/119, 122, 126; 29/603.07

(56) References Cited

U.S. PATENT DOCUMENTS

| | | | |
|---|---|---|---|
| 4,339,305 | * 7/1982 | Jones | 156/650 |
| 5,126,232 | * 6/1992 | Gau | 430/320 |
| 5,285,340 | 2/1994 | Ju et al. | 360/119 |
| 5,652,687 | 7/1997 | Chen et al. | 360/126 |
| 5,722,162 | * 3/1998 | Chou et al. | 29/852 |
| 5,802,700 | 9/1998 | Chen et al. | 29/603.14 |
| 5,812,350 | 9/1998 | Chen et al. | 360/126 |
| 5,940,253 | 8/1999 | Mallary et al. | 360/126 |

\* cited by examiner

*Primary Examiner*—John A. McPherson
(74) *Attorney, Agent, or Firm*—George O. Saile; Stephen B. Ackerman

(57) ABSTRACT

It has been observed that plated structures grown inside molds for small objects, such as a gap structure in a magnetic read head, often have curved rather than planar surfaces. This problem has been overcome as follows. Prior to laying down photoresist for the mold, a layer of copper is deposited on the substrate on which the head structure is to be grown (normally the shared pole). After the photoresist is patterned to form the mold, all exposed copper is selectively removed from the substrate a key feature being that the copper is over-etched so that some undercutting of the photoresist occurs. Then, when the layers making up the gap structure are electrodeposited inside the mold they grow away from the substrate as planar surfaces.

20 Claims, 4 Drawing Sheets

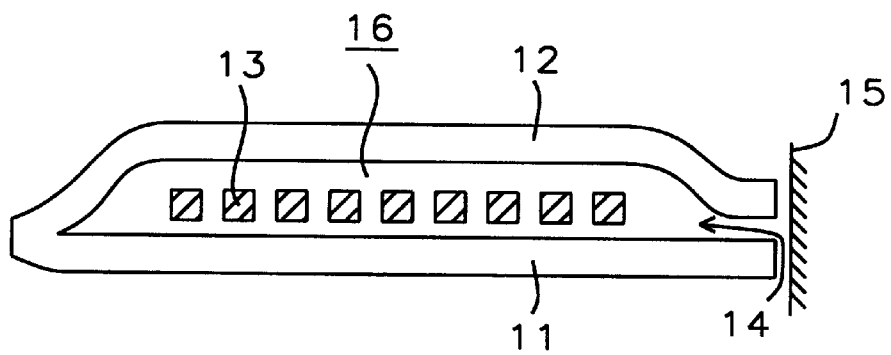
FIG. 1 – Prior Art
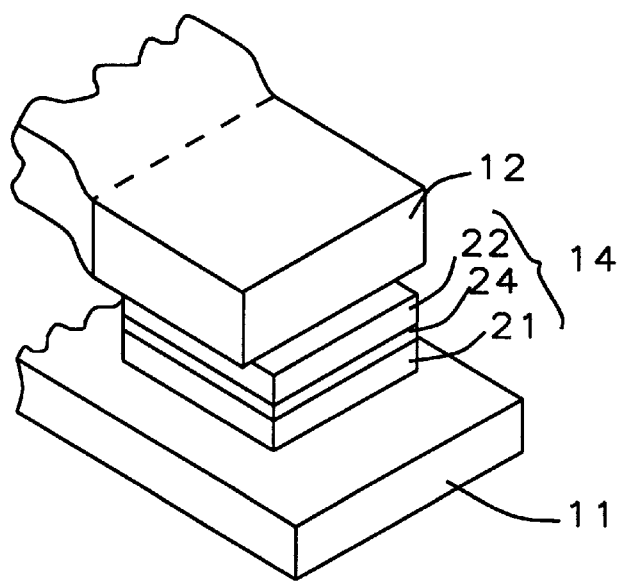
FIG. 2

PLATED FLAT METAL GAP FOR VERY NARROW RECORDING HEADS

FIELD OF THE INVENTION

The invention relates to the formation of write heads for magnetic disk systems with particular reference to very narrow heads that comprise multiple layers deposited by electroplating.

BACKGROUND OF THE INVENTION

Referring to FIG. 1, we show, in schematic representation, a cross-sectional view of a write head for a magnetic disk system. The magnetic field needed to perform the write operation is generated by flat coil 16 made up of a number of turns (typically between about 8 and 8). Surrounding the flat coil are upper and lower pole pieces 12 and 11 respectively, made of a magnetic material such as nickel-iron. These pole pieces are joined at one end (on the left in this figure) and are separated by region 14 at the other end. The magnetic field that is generated by flat coil 16 ends up being concentrated in region 14. It is sufficiently powerful that the fringing field that extends outwards away from 14 is capable of magnetizing the magnetic storage medium over whose surface 15 the head 'flies'. The distance between region 14 and surface 15 is typically between about 10 and 50 nm. In practice, lower pole 11 is also used as a magnetic shield for the reading assembly that is located immediately below it. The latter can comprise many layers and is not shown in the figure. For this reason, pole 11 is usually referred to as the shared pole.

In FIG. 2 we show a more detailed view of the parts that make up region 14, the gap structure. Rather than being a simple gap between poles 11 and 12, the gap structure is made up of two additional magnetic sub-components, sub-shared pole layer 21 and sub-top pole layer 22, separated by gap layer 24 of a non-magnetic material. The area of these sub-poles is significantly less than that of the opposing flat portions of 11 and 12 that make up the gap region 14 in FIG. 1. Thus, the introduction of sub-poles serves to concentrate the magnetic flux across gap 24 making for more intense fringing fields in its vicinity.

In U.S. Pat. No. 5,285,340 in February 1994, Ju et al. describe a pole tip structure, similar to that shown in FIG. 2, which can be formed by a single photolithographic process. Their basic approach was to use a photoresist mold inside which the layers 21, 22, and 24 could be grown by electroplating, following which the photoresist is removed in a conventional manner. While the process of Ju et al. represents a significant improvement to the art, there are associated problems. In particular, as the inside dimensions of the photoresist mold grow smaller, there is a growing tendency for the plated layers that are laid down inside it to acquire curved, non-planar surfaces. This, of course, reduces both the strength as well as the spatial resolution of the gap. The present invention provides an explanation for this problem as well as a solution for it.

A routine search of the prior art was conducted but no references that teach the solution disclosed in the present invention were encountered. Several references of interest were, however, found. For example, in U.S. Pat. No. 5,940,253, Mallary et al. show how photoresist may be used to prevent edge shorting in a laminated plated pole structure.

In U.S. Pat. No. 5,652,687, Chen et al. describe a modified sub-top pole in the shape of a U thus changing the aspect ratio of the gap. A method, based on using a very thin photoresist layer, for manufacturing this structure is disclosed in U.S. Pat. No. 5,802,700 (Chen et al.). In U.S. Pat. No. 5,812,350, Chen et al. modify the behavior of the gap by including a layer of nickel iron having a different composition from the standard $Ni_{81}Fe_{19}$.

SUMMARY OF THE INVENTION

It has been an object of the present invention to provide a process for manufacturing a write head for a magnetic disk system.

Another object of the invention has been that said process focus on the gap region of said write head with particular attention to the formation through electroplating of sub poles around the gap.

A still further object has been that said electroplated material be deposited in layers that are planar.

These objects have been achieved by growing the head structure within a photoresist mold. Prior to laying down the photoresist, a layer of copper is deposited on the substrate on which the head structure is to be grown (normally the shared pole). After the photoresist is patterned to form the mold, all exposed copper is selectively removed from the substrate a key feature being that the copper is over-etched so that some undercutting of the photoresist occurs. Then, when the layers making up the gap structure are electrodeposited inside the mold they grow away from the substrate as planar surfaces, in contrast to the curved surfaces that are obtained when processes of the prior art are used.

BRIEF DESCRIPTION OF THE DRAWINGS

FIG. 1 shows the structure of a write head for use in a magnetic disk system.

FIG. 2 is a closeup of the gap structure seen in FIG. 1.

DESCRIPTION OF THE PREFERRED EMBODIMENTS

As discussed earlier, as the inside dimensions of a photoresist mold grow smaller, there is a growing tendency for plated layers that are laid down inside it to acquire curved, non-planar surfaces. As is well known, photoresist patterns, after development, usually include footings whereby, at the base of layers, sharp corners are not formed, being instead bridged in a diagonal-like manner. This problem grows worse as the relevant dimensions grow smaller. Using a simulation program, the build-up of electroplated layers inside a small cavity was studied. The results for the case where the base of the cavity was given footed edges is shown in FIG. 3.

Figure 3:
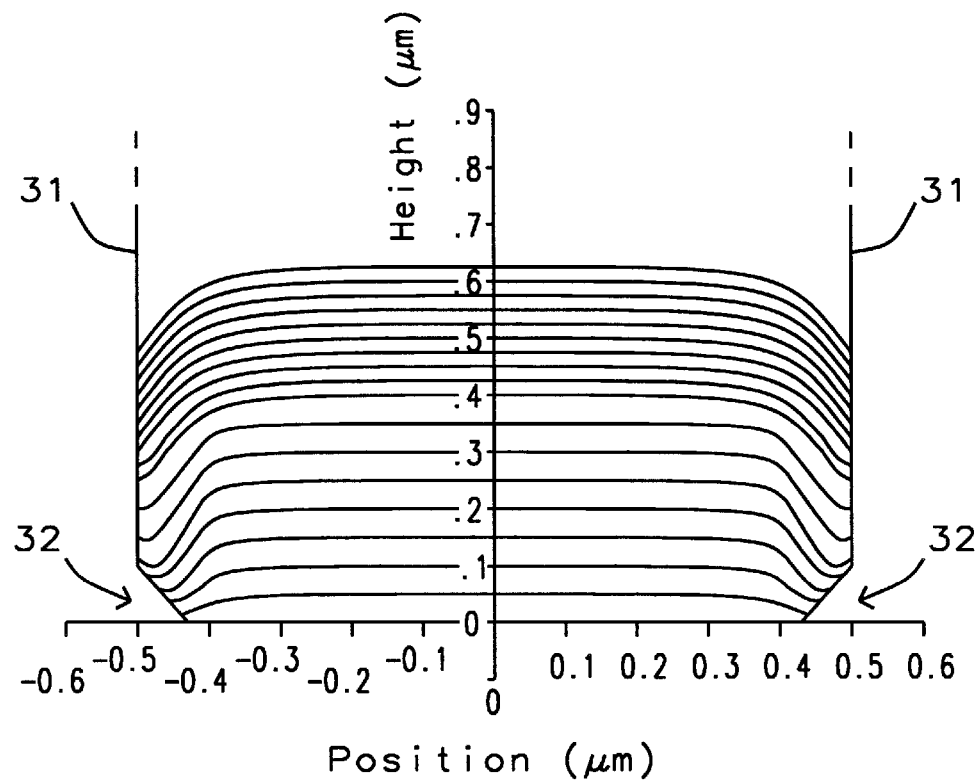
FIGS. 3 and 4 are simulated cross-sections of electro-deposited films in two cavities having different shapes.

As seen in FIG. 3, the walls 31 of the cavity are vertical but at the bottom they slope inwards to form footings 32. The figure shows contours of equal deposition time for the growth of a layer inside the cavity. As can be seen, said contours show a reduction in thickness at the walls of the cavity, said thickness reduction becoming increasingly more severe as the dimensions of the deposited film grow smaller.

This data made it clear that, since the seed layer for electrodeposition was limited to the horizontal bottom of the cavity, material in the vicinity of the footings could not grow vertically, in concert with the main body of material, but had to grow in a horizontal direction until the surface of the footing was reached. Thus, the layer took longer to build up near the footings, resulting in the contours shown.

Since it is not known how to routinely eliminate the formation of footings in photoresist, the effect of slightly undercutting the photoresist near the base of the cavity was examined. The effectiveness of this approach was confirmed by simulating the case shown in FIG. 4. Here the vertical walls 42 near the base of the cavity were made to extend outwards away from the center. The results of the simulation can be seen in the figure. They confirm that, as long as the walls do not slope inwards at the bottom of the cavity, a perfectly planar deposition front is obtained and that undercutting the walls of the cavity at its base achieves this result.

Figure 4:
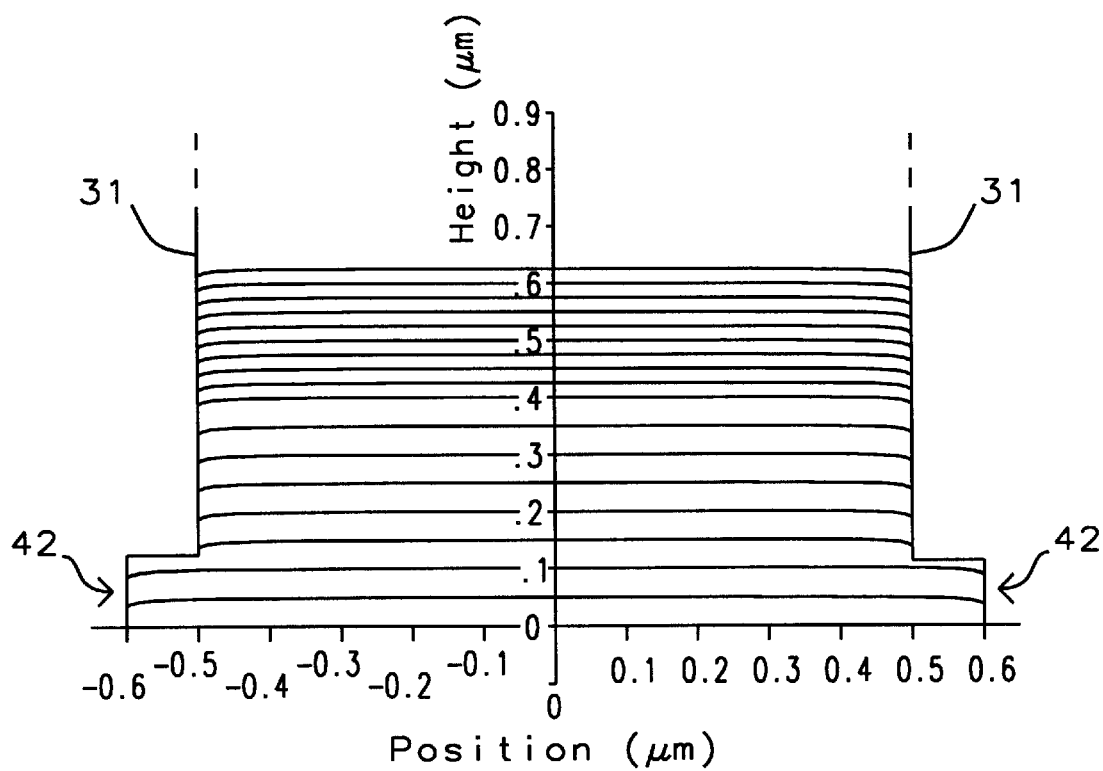

We will now describe the present invention which is a process for forming a photoresist cavity based on the simulation results seen in FIG. 4 whereby planar surfaces are obtained when electrodeposition takes place inside the cavity. We note that a different process for achieving this was filed with the Patent Office on Jul. 23, 1999 as application Ser. No. 09/360,121. While said earlier process works as described, the process of the present invention offers the advantage of accurately and easily controlling undercut height and length.

Figure 5:
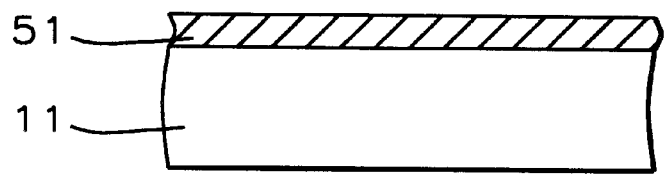
FIG. 5 is the starting point for the process of the present invention.

Referring, now to FIG. 5, we show there the starting point for the process of the present invention, namely shared pole piece 11. Not shown (since they are incidental to the present invention) are an insulating substrate on whose upper surface is a multi-layer structure for reading magnetic information this being topped by layer 11 of nickel iron which, as noted earlier, does double duty as a magnetic shield and as a lower pole piece.

Since layer 11 is conductive it could be used, as is, as a seed layer for growing an electroplated layer. However, in a departure from the prior art, the first step in the process of the present invention is to deposit metal layer 51 on layer 11. Our preferred material for layer 51 has been copper but, in the general case, any material that can be selectively etched relative to layer 11 could be used. Copper layer 51 is deposited to a thickness between about 300 and 1,500 Angstroms. Our preferred selective etch for the copper layer has been an aqueous solution of ammonium persulfate and dodecane but any similar etching solution could also have been used.

Figure 6:
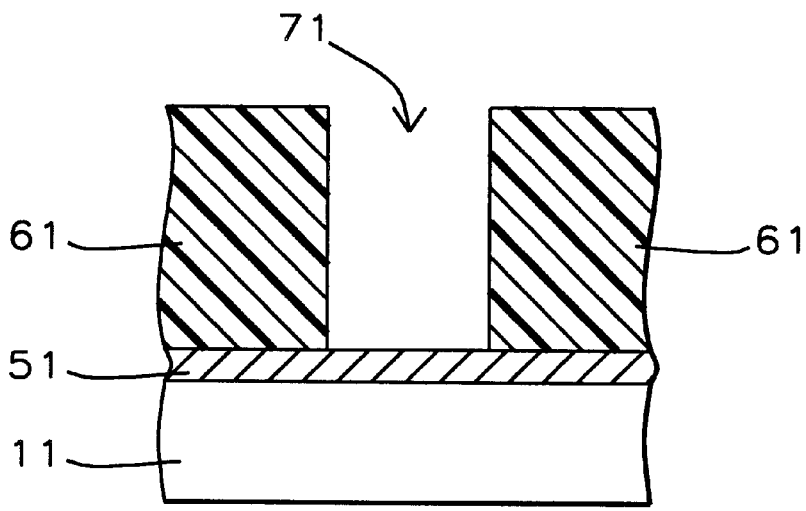
FIGS. 6 and 7 show how a suitable photoresist mold is formed.

Next, as shown in FIG. 6, layer 51 is coated with photoresist layer 61. It is important that layer 61 be thicker than the combined thicknesses of the three layers that are yet to be deposited to form the gap structure 14 (FIG. 2). When completed, the gap structure will have a thickness, or depth, of between about 0.8 and 5 microns.

Figure 7:
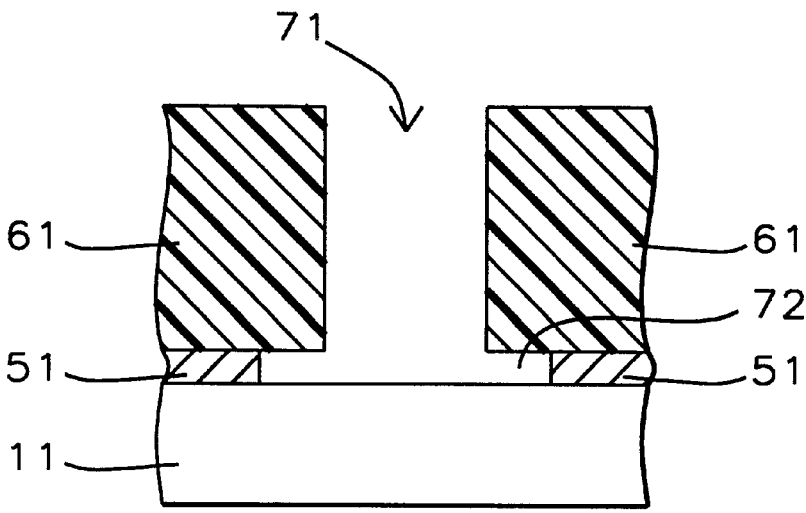

Once layer 61 is in place it is patterned by exposure and development to form cavity 71 over layer 51. The inside width of cavity 71 is between about 0.3 and 1.5 microns. The exposed portions of layer 51 are now etched away and, as a key feature of the invention, said layer is over-etched, i.e. etching is allowed to continue well past the point where all the exposed part of layer 51 has been removed. In general, over-etching was allowed to continue for up to about 2 minutes after all exposed copper had been removed. As a consequence, the amount of undercutting of the photoresist was up to about 0.5 microns, horizontally, and between about 0.03 and 0.15 microns, vertically. The result of this is seen in FIG. 7 where undercut 72 of the resist can be seen. In this way cavity 71 has been made to resemble the cavity on which the simulation data seen in FIG. 4 were based.

Figure 8:
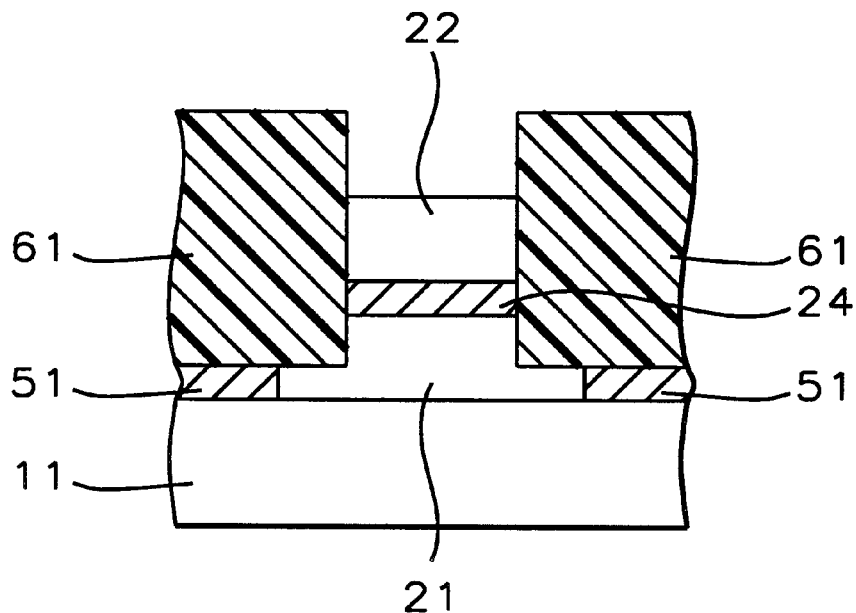
FIG. 8 shows the mold of FIG. 7 after material has been plated inside it.

With the photoresist mold 61 of FIG. 7 in place, sub-shared pole layer 21, gap layer 24, and sub-top pole layer 22 are successively deposited on shared pole layer 11 by means of electroplating. The thicknesses of these layers were: sub-shared pole layer 21 up to about 0.8 microns, gap layer 24 between about 0.1 and 0.3 microns, and sub-top pole layer 22 between about 0.4 and 3 microns. This is shown in FIG. 8.

Figure 9:
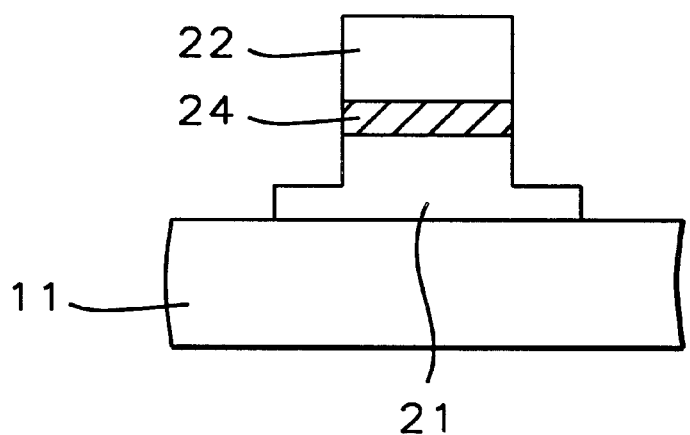
FIG. 9 is the gap structure fabricated according to the process of the present invention.

The process concludes with the removal of the photoresist 61, as well as all remaining areas of layer 51, leaving behind the gap structure 14 on shared pole layer 11 as seen in FIG. 9. The full read head structure can then be completed by forming flat coil 16 and upper pole layer 12 over the shared pole layer followed by planarizing the right hand edge of gap structure 14, as seen in FIG. 1 so as to present a flat surface to recorded data layer 15.

While the invention has been particularly shown and described with reference to the preferred embodiments thereof, it will be understood by those skilled in the art that various changes in form and details may be made without departing from the spirit and scope of the invention.

What is claimed is:

1. A process for forming a mold suitable for electroforming a small structure having a thickness, comprising:

providing an electrically conductive substrate and depositing thereon a layer of a metal that is selectively etchable relative to said substrate;

coating the metal layer with a layer of photoresist to a thickness greater than the thickness of the structure;

patterning the photoresist to form a cavity that will define the shape of the small structure;

selectively etching away all exposed portions of the metal layer; and then over-etching the metal layer, thereby undercutting the photoresist by up to about 0.5 microns which ensures that all layers plated within the cavity will be planar.

2. The process of claim 1 wherein the thickness of the structure is between about 0.8 and 5 microns.

3. The process of claim 1 wherein the cavity has a width between about 0.3 and 1.5 microns.

4. The process of claim 1 wherein the metal layer has a thickness between about 0.05 and 0.15 microns.

5. A process for forming a magnetic gap structure, having a shape, a depth, and a width, as part of a write head for use in a magnetic disk system, comprising:

providing a shared pole layer of nickel-iron;

on said shared pole layer depositing a layer of copper;

coating the copper layer with a layer of photoresist to a thickness greater than the depth of the gap structure;

patterning the photoresist to form a cavity that defines the shape of the gap structure;

selectively etching away all exposed copper;

over-etching the copper layer, thereby undercutting the photoresist by an amount;

through electroplating, depositing on the shared pole layer a sub-shared pole layer;

through electroplating, depositing on the sub-shared pole layer a gap layer; and through electroplating, depositing on the gap layer a sub-top pole layer.

6. The process of claim 5 wherein the magnetic gap structure has a depth between about 0.8 and 5 microns.

7. The process of claim 5 wherein the photoresist cavity has a width between about 0.3 and 1.5 microns.

8. The process of claim 5 wherein the copper layer is deposited to a thickness between about 0.05 and 0.15 microns.

9. The process of claim 5 wherein selective etching of the copper layer is achieved using an aqueous solution of ammonium persulfate and dodecane.

10. The process of claim 5 wherein over-etching further comprises etching for up to about 2 minutes after all exposed copper has been removed.

11. The process of claim 5 wherein the amount of undercutting of the photoresist is up to about 0.5 microns.

12. The process of claim 5 wherein the sub-shared pole layer is deposited to a thickness of up to about 0.8 microns.

13. The process of claim 5 wherein the gap layer is deposited to a thickness between about 0.1 and 0.3 microns.

14. The process of claim 5 wherein the sub-top pole layer is deposited to a thickness between about 0.4 and 3 microns.

15. A process for manufacturing a write head structure for a magnetic disk system, comprising:

provic an insulating substrate on whose upper surface are means for reading magnetic information, said means having a top layer that comprises a magnetic shield of nickel iron, said shield also serving as a shared pole piece for the write head;

on said shared pole layer depositing a layer of copper;

coating the copper layer with a layer of photoresist;

patterning the photoresist to form a cavity over the copper layer;

over-etching the copper layer, thereby etching away all exposed copper and undercutting the photoresist by an amount;

through electroplating, successively depositing on the shared pole layer a sub-shared pole layer, a gap layer, and a sub-top pole layer;

removing the photoresist and any remaining areas of the copper layer, thereby forming a gap structure, and then forming a flat coil and an upper pole layer over the shared pole layer; and planarizing the write head structure whereby the gap structure, the shared pole layer, and the upper pole layer each has an end, said ends being coplanar.

16. The process of claim 15 wherein the gap structure has a depth between about 0.8 and 5 microns.

17. The process of claim 15 wherein the photoresist cavity has a width between about 0.3 and 2 microns.

18. The process of claim 15 wherein the copper layer is deposited to a thickness between about 0.05 and 0.15 microns.

19. The process of claim 15 wherein over-etching further comprises continuing to etch for up to about 2 minutes after all exposed copper has been removed, using an aqueous solution of ammonium persulfate and dodecane.

20. The process of claim 15 wherein the amount of undercutting of the photoresist is up to about 0.5 microns.

* * * * *